US006225898B1

(12) United States Patent
Kamiya et al.

(10) Patent No.: US 6,225,898 B1
(45) Date of Patent: May 1, 2001

(54) VEHICLE DIAGNOSIS SYSTEM HAVING TRANSPONDER FOR OBD III

(75) Inventors: Kenji Kamiya, Anjo; Norichika Kawabata, Kariya; Yuuichirou Matsuura, Kariya; Kenzo Furusawa, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/303,438

(22) Filed: May 3, 1999

(30) Foreign Application Priority Data

May 13, 1998 (JP) ..................................... 10-130419

(51) Int. Cl.[7] ............................ G08B 26/00; B60Q 1/00

(52) U.S. Cl. ......................... 340/505; 340/438; 340/439; 340/425.5; 340/10.1; 701/29; 701/33; 702/183; 702/188

(58) Field of Search ............................ 340/505, 425.5, 340/438, 439, 539, 825.69, 825.72, 10.1, 10.51; 701/29, 33, 35, 2; 702/57, 62, 183, 188; 307/10.1

(56) References Cited

U.S. PATENT DOCUMENTS 5,541,840 * 7/1996 Gurne et al. ........................ 73/118.1
5,787,367 * 7/1998 Berra ........................................ 701/1
5,916,286 * 6/1999 Seashore et al. ....................... 701/29
5,987,394 * 11/1999 Takakura et al. .................... 702/123
6,025,776 * 2/2000 Matsuura ............................. 340/438
6,055,468 * 4/2000 Kaman et al. .......................... 701/29
6,067,009 * 5/2000 Hozuka et al. ....................... 340/459
6,084,870 * 7/2000 Wooten et al. ....................... 340/459

FOREIGN PATENT DOCUMENTS 3-4660 1/1991 (JP) .
5-332888 12/1993 (JP) .
7-50886 2/1995 (JP) .

* cited by examiner

*Primary Examiner*—Donnie L. Crosland
(74) *Attorney, Agent, or Firm*—Nixon & Vanderhye P.C.

(57) ABSTRACT

A vehicle diagnosis system can handle with OBD III as well as OBD II by only adding a transponder to an OBD II system. The vehicle diagnosis system includes an engine ECU for controlling an engine device such as injector and storing a diagnosis data, a K-line connected to the engine ECU, a transponder connected to the K-line, and a connector connected to the K-line for detachably connecting an external scan tool that reads the diagnosis data stored in the engine ECU. The transponder receives a request from a receiver system by radio, reads the diagnosis based on the request, and sends the read diagnosis data to the receiver system.

36 Claims, 13 Drawing Sheets

FIG. 3

REFERENCE TABLE

| ELEMENT NO. | OBDII MODE | ID | FRAME NO. | DATA |
|---|---|---|---|---|
| 0 | 03 | – | – | DIAG. CODE |
| 1 | 02 | 02 | 01 | FREEZE DATA (ID02) |
| 2 | ↑ | ↑ | 02 | ↑ |
| 3 | ↑ | 03 | 01 | FREEZE DATA (ID03) |
| 4 | ↑ | ↑ | 02 | ↑ |
| ⋮ | ⋮ | ⋮ | ⋮ | ⋮ |
| n-3 | 01 | ** | – | ENGINE CODE ① |
| n-2 | ↑ | ** | – | ENGINE CODE ② |
| n-1 | ↑ | ** | – | ENGINE CODE ③ |
| n | ↑ | ** | – | MODEL YEAR |

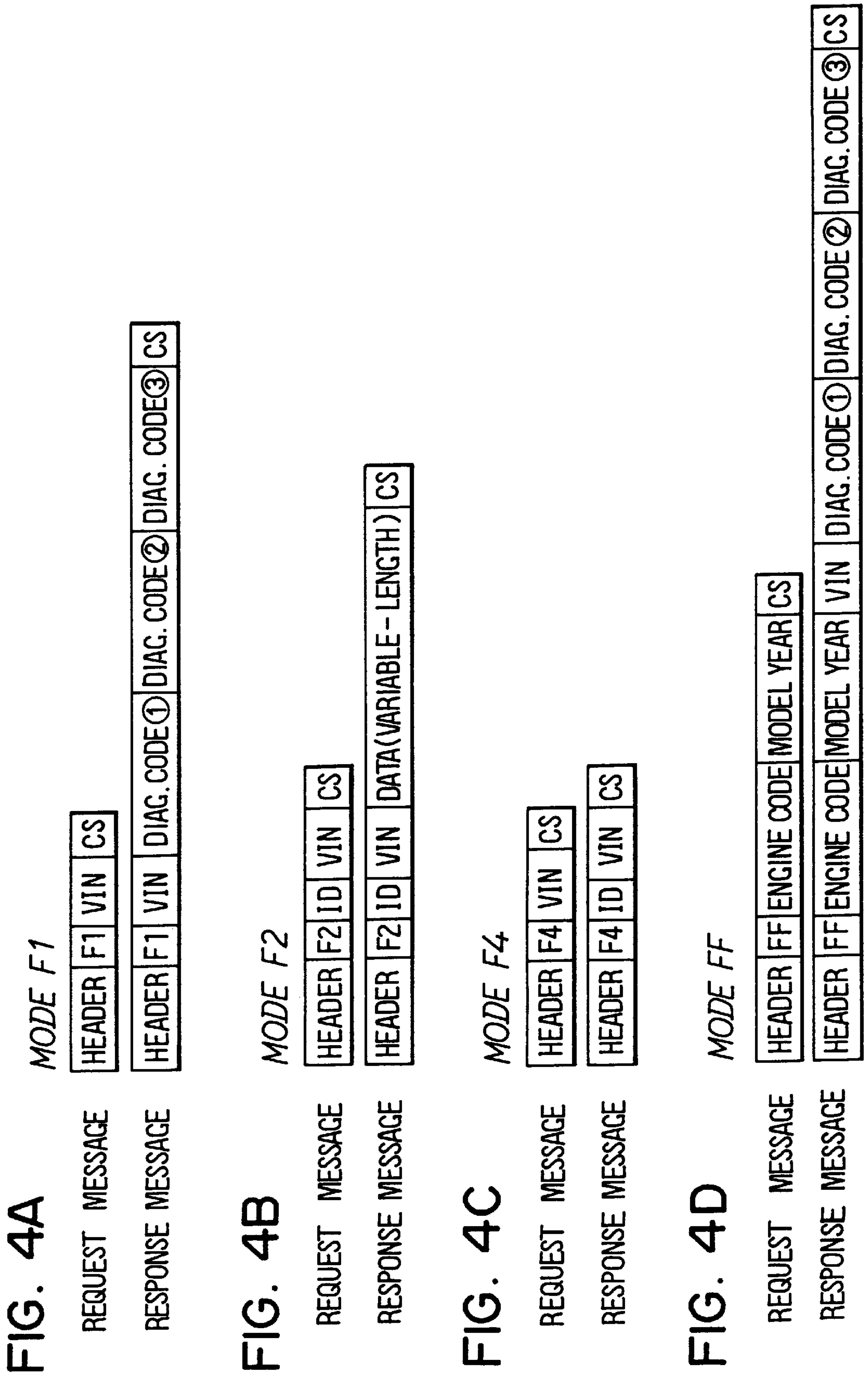
FIG. 4A
MODE F1
REQUEST MESSAGE
HEADER | F1 | VIN | CS
RESPONSE MESSAGE
HEADER | F1 | VIN | DIAG. CODE ① | DIAG. CODE ② | DIAG. CODE ③ | CS
FIG. 4B
MODE F2
REQUEST MESSAGE
HEADER | F2 | ID | VIN | CS
RESPONSE MESSAGE
HEADER | F2 | ID | VIN | DATA (VARIABLE - LENGTH) | CS
FIG. 4C
MODE F4
REQUEST MESSAGE
HEADER | F4 | VIN | CS
RESPONSE MESSAGE
HEADER | F4 | ID | VIN | CS
FIG. 4D
MODE FF
REQUEST MESSAGE
HEADER | FF | ENGINE CODE | MODEL YEAR | CS
RESPONSE MESSAGE
HEADER | FF | ENGINE CODE | MODEL YEAR | VIN | DIAG. CODE ① | DIAG. CODE ② | DIAG. CODE ③ | CS

VEHICLE DIAGNOSIS SYSTEM HAVING TRANSPONDER FOR OBD III

CROSS-REFERENCE TO RELATED APPLICATIONS

This application is based upon Japanese Patent Applications No. Hei. 10-130419 filed May 13, 1998, the contents of which are incorporated herein by reference.

BACKGROUND OF THE INVENTION

1. Field of the Invention

The present invention relates to a vehicle diagnosis system and a vehicle diagnosis apparatus, which can diagnose a vehicle.

2. Description of Related Art

A conventional vehicle diagnosis system in an electronic control unit (engine ECU) mounted on a vehicle stores a diagnosis code corresponding to a detected trouble in a backup RAM, and informs a trouble occurrence to user by lighting a warning lamp such as a check engine lamp. This system is equivalent to OBD(California On Board Diagnosis) II. In the case of a vehicle which mounts the OBD II system, several ECUs mounted on the vehicle are connected to an external scan tool via a K-line in a repair shop. The external scan tool communicates with the ECUs by IS09141 protocol using a communication format decided by SAE, and reads the diagnosis code to diagnose a trouble.

Recently, CARB (California Air Resource Bureau) requests that the diagnosis system have a radio transponder so that it can reply for requests by using a radio communication (i.e., OBD III).

Several vehicle diagnosis systems have proposed to communicate the diagnosis data by using the radio communication. For example, in a vehicle diagnosis system, as described in Japanese Laid-open Patent No.5-332888, a trouble message including trouble data from each engine ECU and predetermined identified code is sent as a radio signal using a weak radio wave. Receiving stations provided in some areas receive the trouble message each of which is sent from vehicles in the area, and send the received trouble message to a terminal unit in a repair shop via a telephone line. Then, the terminal unit can identify a user and detect trouble contents of user's vehicle.

In a vehicle diagnosis system, as described in Japanese Laid-open Patent No. 7-50886, an FM radio diagnosis device receives an FM radio signal from an external diagnosis device provided in a repair shop or the like, and then send command data related to the FM radio signal to each engine ECU mounted on the vehicle. When each engine ECU sends a response, the FM radio diagnosis device takes out diagnosis data from the response and sends an FM radio signal related to the taken-out diagnosis data to the external diagnosis device.

Further, in a vehicle diagnosis system, as described in Japanese Laid-open Patent No. 3-4660, a measuring device is connected to engine ECU mounted on the vehicle. The measuring device has a radio communication portion for sending and receiving a radio signal. The measuring device connects the engine ECU to an external control center via an automobile telephone network by using the radio communication portion. When a diagnosis instruction is input to an input control terminal of the measuring device, vehicle diagnosis data is output from the engine ECU. Then the vehicle diagnosis data is sent to the external control center to diagnose the diagnosis data. Finally, a result of the diagnosis is returned to the radio communication portion of the measuring device.

Here, when there are not many radio wave monitor stations, it is desired to diagnose the vehicle by using the external scan tool. However, none of the above-mentioned conventional vehicle diagnosis system meets this desire.

Further, even if there are many radio wave monitor stations, it may take long time for many vehicles to have diagnosis system equivalent to OBD III, if such a diagnosis system is newly developed.

SUMMARY OF THE INVENTION

The present invention was accomplished in view of the above-mentioned inconvenience. An object is to provide a vehicle diagnosis system, which can easily handle not only OBD II but also OBD III by using a conventional OBD II system.

According to the present invention, an electronic control unit, a transponder and a connector are connected via a communication line. The transponder receives a request signal from the external radio communication device by radio, reads the operation data concerning the operation condition in response to the request signal, and sends the operation data to the external radio communication device by radio. The external scan tool, which is used in such as a repair shop, can read the operation data stored in the electronic control unit, when it is connected to the communication line via the connector.

The transponder is capable of communication with the external radio communication device and the electronic control unit. Furthermore, the transponder is capable of reading the operation data stored in the electronic control unit like the external scan tool. Therefore, this vehicle diagnosis system becomes compatible with the OBD III by only adding the transponder to the conventional OBD II system. Furthermore, since the external scan tool can connect to the connector of the communication line, the vehicle diagnosis system is also compatible with the OBD II.

BRIEF DESCRIPTION OF THE DRAWINGS

FIG. 3 is a reference table illustrating a relation between an element number and other parameters such as OBD II mode;

FIGS. 4A–4D are diagrams illustrating a radio communication format between a receiver system and the transponder;

DETAILED DESCRIPTION OF THE PREFERRED EMBODIMENTS (First Embodiment)

Figure 1:
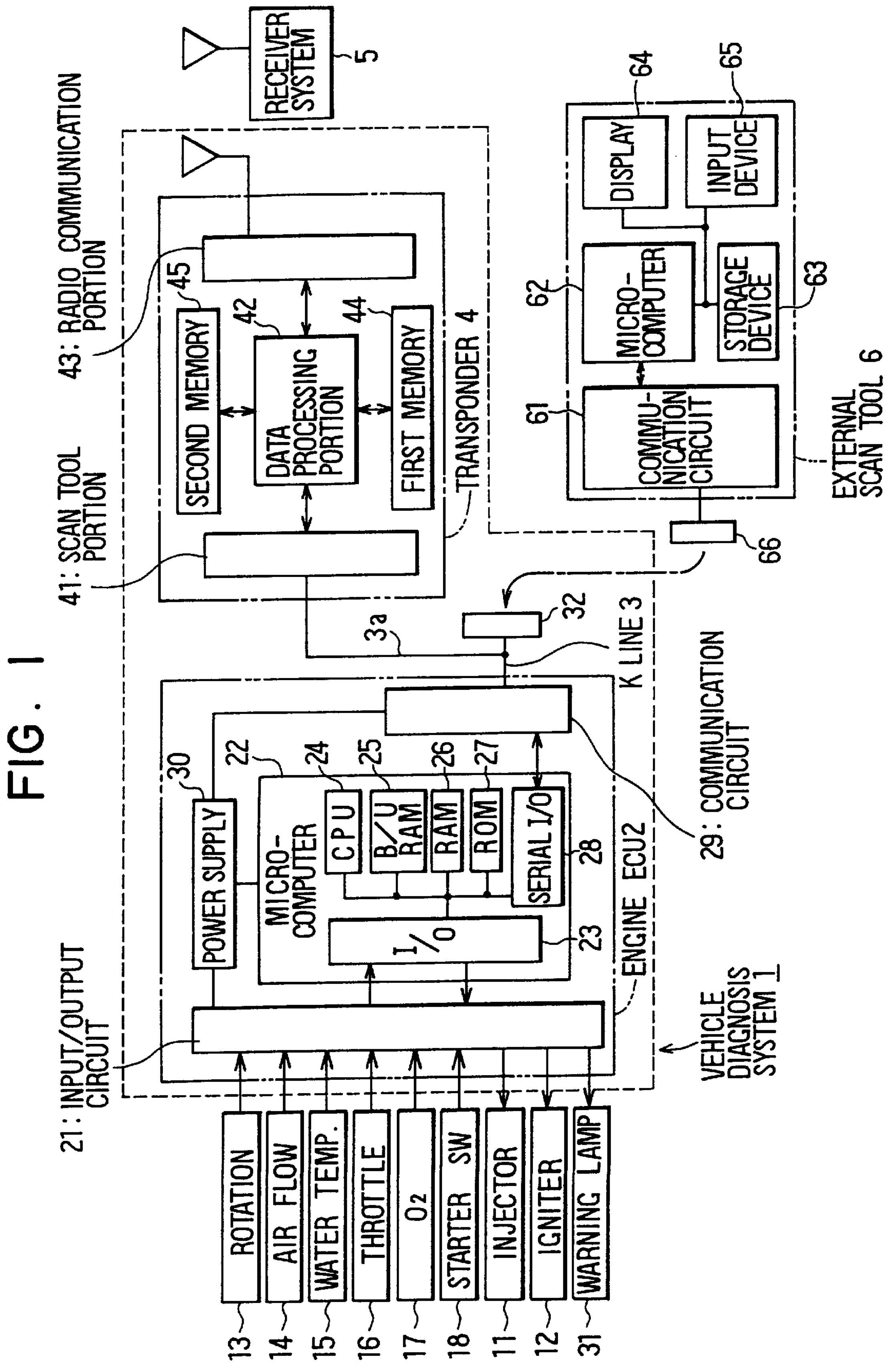
FIG. 1 is a schematic diagram illustrating a construction of whole system of a vehicle diagnosis system according to a first embodiment of the present invention.

A first embodiment of the present invention will be described hereinafter with reference to FIGS. 1–13. FIG. 1 is a diagram illustrating the construction of whole system of a vehicle diagnosis system.

The diagnosis system 1 includes an engine ECU 2, K-line 3 and a transponder 4.

The engine ECU 2 controls operations of electronic devices such as a fuel injector (hereinafter, injector) 11 or igniter 12, which are mounted on the vehicle. The engine ECU 2 also stores (memorizes) diagnosis data, as data related to an operation condition, in a backup RAM 25. Here, the electronic device includes such as parts related to a vehicle engine, an automatic transmission, and ABS system. A microcomputer 22 of the engine ECU 25 receives input signals output from a rotation sensor for measuring a rotation speed, an air-flow sensor 14 for measuring an air amount, a coolant temperature sensor 15 for measuring a coolant temperature, a throttle sensor 16 for measuring an opening degree of a throttle valve, an $O_2$ sensor 17 for detecting an oxygen concentration in exhaust gas, a starter switch 18 for starting a starter motor for instance. The microcomputer 22 receives the above-mentioned signals via an input/output circuit 21, and inputs the signals to an I/O 23 in the microcomputer 22. A CPU 24 of the microcomputer 22 calculates a fuel injection quantity and fuel timing suitable for an engine, and ignition timing based on the input signals through several control routines or programs memorized in a ROM 27. A RAM 26 is used for temporary storing some data during executing the control routines. Then the CPU 24 outputs the signals indicative of injection quantity, the injection timing and the ignition timing to the electronic device such as the injector 11 or igniter 12 via the input/output circuit 21.

The microcomputer 22 detects each portion of the vehicle whether it is normal or abnormal condition based on the input signals from the sensors by executing a self-diagnosis program. For example, an abnormality detection procedure of the air-flow sensor 14 will be explained. This procedure is executed every predetermined time. The microcomputer 22 detects whether an output from the air-flow sensor 14 is within a predetermined range. When the output is within the predetermined range, the microcomputer 22 sets a normality detection flag of an air-flow meter and resets an abnormality detection flag. When the output is not within the predetermined range, the microcomputer 22 sets the abnormality detection flag to indicate for occurrence a trouble. Then, the microcomputer 22 detects whether the abnormality detection flag is set or not. When the abnormality detection flag is set, the microcomputer 22 lights on a warning lamp 31 for indicating an abnormal condition of the air-flow sensor 14, and stores a diagnosis code previously determined in relation to an occurrence point and a kind of the abnormal condition in the backup RAM 25.

A serial I/O 28 of the microcomputer 22 is connected to the K-line 3 via a communication circuit 29 to communicate with the transponder 4 or the external scan tool 6 based on such as ISO9141-2 protocol. The input/output circuit 21, the microcomputer 22, and the communication circuit 29 are powered by a power supply 30.

The K-line 3 is a communication line which is compatible with the OBD II. The K-line 3 electrically connects the external scan tool 6 to the engine ECU 2 by detachably connecting the external scan tool 6 to a connector 32. Here, the external scan tool 6 is for reading the diagnosis data stored in the engine ECU 2. The K-line 3 has a branch line 3*a,* which is connected to the transponder 4, for branching the K-line at intermediate point between the connector 32 and the engine ECU 2.

The transponder 4 receives a request by a radio data from a receiver system 5 (e.g., a receiver disposed at side of road or satellite) as an external radio communication device. The transponder 4 reads the diagnosis data based on the request, and sends the read diagnosis data to the receiver system 5 by the radio data. The transponder 4 includes a scan tool portion 41, a data processing portion 42, a radio communication portion 43, a first memory 44 and a second memory 45. The scan tool portion 41 collects the diagnosis data from the engine ECU 2 by communicating with the engine ECU 2 via the K-line 3. The data processing portion 42 instructs the scan tool portion 41 with the diagnosis data to be read from the engine ECU 2, and generates a response message based on the request from the receiver system 5 by the radio data. The radio communication portion 43 communicates with the receiver system 5. In this embodiment, functions of these portions 41, 42, 43 are processed in one microcomputer, however, each function may be processed by independent microcomputer. The first memory 44 stores the diagnosis data, the second memory stores a VIN (vehicle code). Each of the first and the second memories 44, 45 is formed by a nonvolatile memory such as EEPROM, a backup RAM or a flash memory. The scan tool portion 41 may have an input device and/or a display device like the external scan tool 6.

The external scan tool 6 is an external diagnosis device which is compatible with the OBD II. In FIG. 1, a connector 66 of the external scan tool 6 is shown as being disconnected from the connector 32 of the K-line. However, when the vehicle is diagnosed in a repair shop or the like, the connector 66 is connected to the connector 32 to collect the diagnosis data from the engine ECU 2. The external scan tool 6 includes a communication circuit 61, a microcomputer 62, a storage device 63 such as an IC card, a display device 64 such as a LCD (Liquid crystal display) and an input device 65 such as a keyboard.

In the external scan tool 6 connected to the connector 32, when diagnosis data items are input to the input device 65 by user, the microcomputer 62 executes a program stored in the storage device 63. According to this program, the microcomputer 62 sends the input diagnosis data items to the engine ECU 2 via both the communication circuit 61 and the K-line 3 by using such as ISO9141-2 protocol with a communication format decided by SAE, and then waits for the response from the engine ECU 2. When the microcomputer 62 receives the response from the engine ECU 2, the display device 64 displays obtained information.

Figure 2:
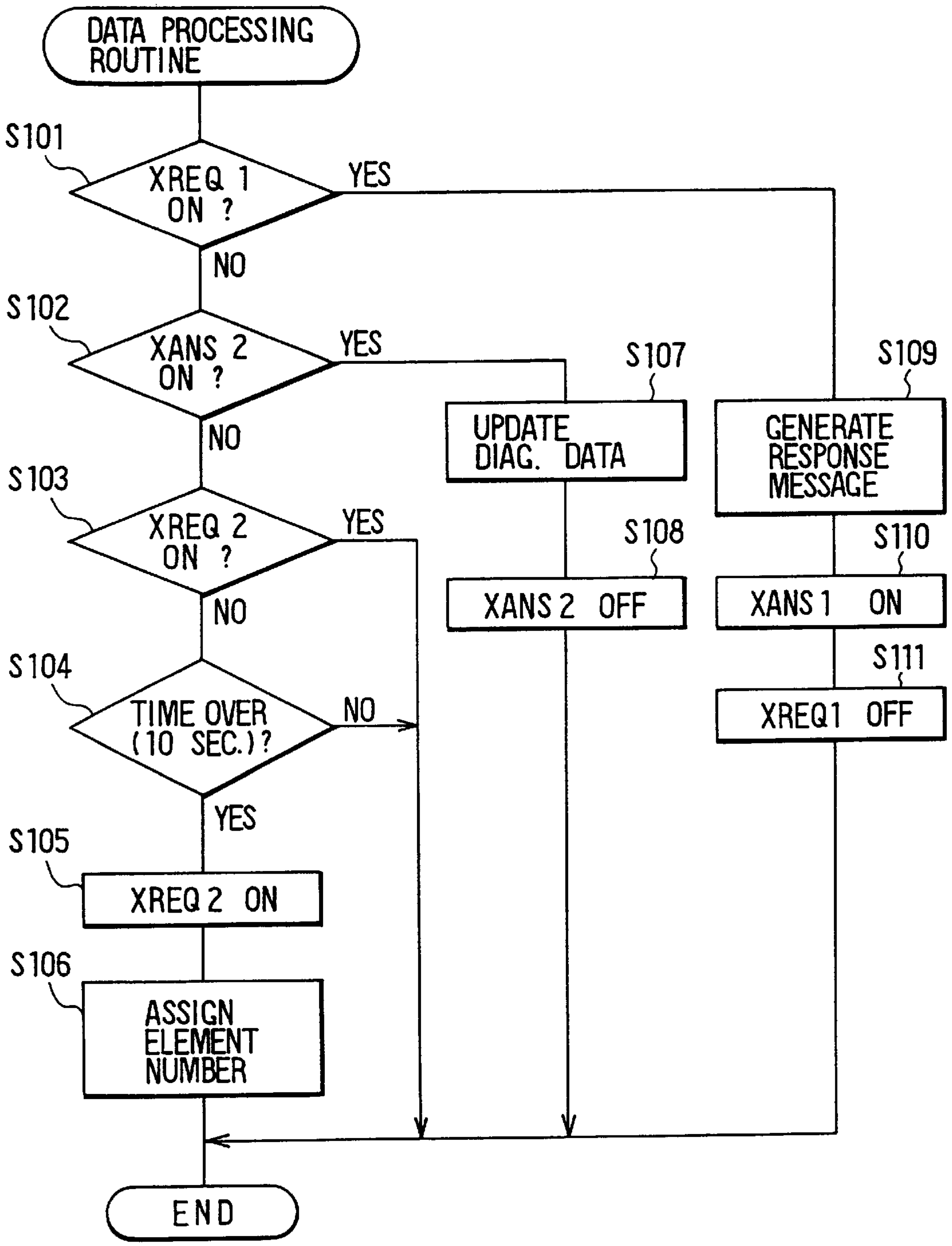
FIG. 2 is a flow chart illustrating a data processing routine of a transponder according to the first embodiment.

Next, an operation of the transponder 4 in the case the external scan tool 6 is not connected to the connector 32 will be explained hereinafter. FIG. 2 shows a flow chart illustrating a data process routine (procedure) of the data processing portion 42 in the transponder 4.

This data processing routine is executed every predetermined time. When the routine starts, at step 101, the data processing portion 42 detects whether a radio request flag XREQ1 is ON or OFF. The radio request flag XREQ1 indicates whether there is a request from the receiver system or not. At step 101, when the radio request flag XREQ1 is OFF ("No" at step 101), following steps 102–108 are executed because there is no request message from the receiver system 5. That is, the data processing portion 42 requests the diagnosis data to the engine ECU 2 via the scan tool portion 41 or receives the diagnosis data from the engine ECU 2 via the scan tool portion 41.

At step 102, the data processing portion 42 detects whether a diagnosis response flag XANS2 is ON of OFF. The diagnosis response flag XANS2 indicates whether the scan tool portion 41 received the response message from the engine ECU 2 or not. At step 102, when the diagnosis response flag XANS2 is OFF ("No" at step 102), following steps 103 is executed because there is no request message from the engine ECU 2.

At step 103, the data processing portion 42 detects whether a diagnosis request flag XREQ2 is ON or OFF. The diagnosis request flag XREQ2 indicates whether an element number is assigned against the scan tool portion 41 or not. Here, the element number means a number which is related to each parameter such as the OBD II mode, ID and frame number, as shown in a reference table in FIG. 3. Here, the OBD II mode means the following relation. That is, the mode 01 is a newest power train data output function, and indicates vehicle information such as several parameters of the engine, engine name and model year. The mode 02 indicates a freeze frame for indicating an engine control condition when the vehicle broke down. The mode 03 indicates the diagnosis code for indicating an abnormal data. The ID indicates such as the coolant temperature or engine rotation speed in number.

At step 103, when the diagnosis request flag XREQ2 is ON ("Yes" at step 103), the routine is discontinued because the process for the element number assigned last time is not over. When the diagnosis request flag XREQ2 is OFF ("No" at step 103), the following step 104 is executed because the element number is not sent from the data processing portion 42 to the scan tool portion 41.

At step 104, the data processing portion 42 detects whether it is at the timing to output the element number to the scan tool portion 41 or not (that is, it is at the timing to output the request message to the engine ECU 2 or not). Here, this embodiment adopts timing of every ten seconds (constant timing). However, it may adopt timing every predetermined rotation of the engine or the like (variable timing).

At step 104, when it is not at the timing every ten seconds ("No" at step 104), the routine is discontinued because it does not need to send the request message to the engine ECU 2. When it is at the predetermined timing (every ten seconds) ("Yes" at step 104), the following step 105 is executed.

At step 105, the data processing portion 42 turns on the diagnosis request flag XREQ2 to inform the scan tool portion 41 of the fact that there is a newly assigned element number.

At step 106, the data processing portion 42 assigns the element number for indicating the diagnosis to be collected, and then the routine is discontinued. Here, an assignment of the element number uses a variable "data_no(k)". In the variable, k is increased from 0 to n every ten seconds, and when k reaches n, k is returned to 0.

Here, at step 102, when the diagnosis response flag XANS2 is ON ("Yes" at step 102), the scan tool portion 41 receives the response message from the engine ECU 2. Therefore, the data processing portion 42 updates the contents of the first memory 44 based on the response message at step 107. Specifically, since the first memory 44 stores the diagnosis data in a table form as shown in FIG. 3, the content of table is changed based on the element number of the response message. After updating, the data processing portion 42 turns off the diagnosis response flag XANS2, and the routine is discontinued. The first memory 44 may memorizes the diagnosis data after processing so as to meet the communication format between the transponder 4 and the receiver system 5, replaced with the table form.

Further, at step 101, when the radio request flag XREQ1 is ON ("Yes" at step 101), the following step 109 is executed because there is the request message from the receiver system 5. In this embodiment, the communication format of the request message by using a radio from the receiver system 5 to the transponder 4 includes a header, a mode assignment or the like. However, the other format can be adapted.

In FIGS. 4A–4D, for convenience, it is postulated that there are four modes having F1, F2, F4 and FF. The mode F1 shows an inquiry of the diagnosis code for a vehicle having a specific vehicle code. The mode F2 shows an inquiry of the freeze frame data code for a vehicle having a specific vehicle code. The mode F4 shows a request for erasing the diagnosis data for a vehicle having a specific vehicle code. The mode FF shows an inquiry of the diagnosis code for a vehicle having a specific engine and model year.

At step 109, the data processing portion 42 detects the mode of the request message from the receiver system 5, and generates the response message corresponding to the mode by using the communication format shown in FIGS. 4A–4D, and stores the response message in a sending buffer (not shown).

At step 110, the data processing portion 42 turns on a radio response flag XANS1, which indicates that a preparation for the sending of the response message to the receiver system 5 is completed.

At step 111, the data processing portion 42 turns off the radio request flag XREQ1, and discontinues the routine.

For example, the procedure of routine at step 109, when the request message is mode F1, will be explained. At step 109, the response message using the communication format shown in FIGS. 4A–4D are formed by the following steps. That is, adding the header, adding "F1" as the mode assignment, adding a VIN which is read from the second memory, and adding the diagnosis code which is read from the element number "0" of the first memory.

For the purpose of fail safe, if the mode is not one of F1, F2, F4 and FF although the radio request flag XREQ1 is ON, the data processing portion 42 detects that some error occurred as to the radio request flag XREQ1. The data processing portion 42 turns off the radio request flag XREQ1 at step 111, and then the routine is discontinued.

Figure 5:
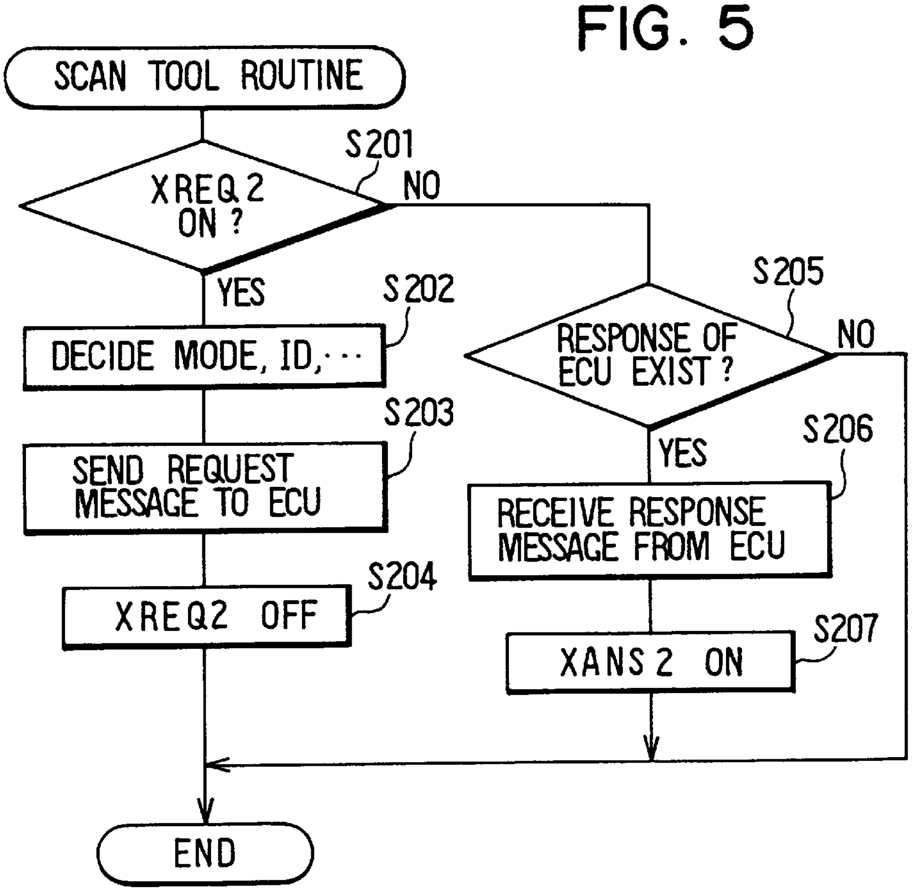
FIG. 5 is a flow chart illustrating a scan tool routine of the transponder according to the first embodiment.

Next, a scan tool routine (procedure) of the scan tool portion 41 will be explained hereinafter with reference to a flow chart of FIG. 5. This data processing routine is executed every predetermined time. When the routine starts, at step 201, the scan tool portion 41 detects whether a diagnosis request flag XREQ2 is ON of OFF. When the diagnosis request flag XREQ2 is ON ("Yes" at step 201), following steps 202 is executed because there is the newly assigned element number in the data processing routine (step 105).

At step 202, the scan tool portion 41 decides the OBD II mode, ID, and the like with reference to the reference table in FIG. 3.

Figure 6A:
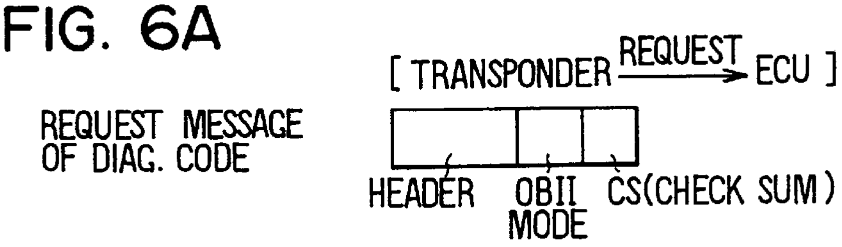
FIGS. 6A–6B are diagrams illustrating a communication format decided by SAE.
Figure 6B:
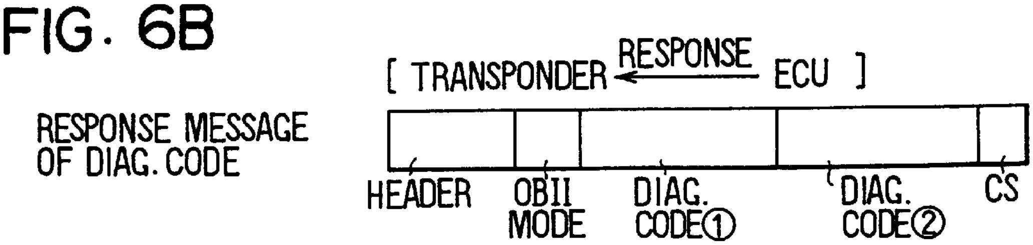

At step 203, the scan tool portion 41 generates a request message by using the communication format decided by SAE as shown in FIGS. 6A–6B (example for request and response for the diagnosis code). Then the scan tool portion 41 sends the generated request message to the engine ECU 2 by using such as ISO9141-2 protocol.

At step 204, the scan tool portion 41 turns off the diagnosis request flag XREQ2, and then the routine is discontinued.

When the diagnosis request flag XREQ2 is OFF at step 201, because there is no newly assigned element number, the scan tool portion 41 detects whether there is the response from the engine ECU 2 or not in the following step 205. When there is no response form the engine ECU 2 ("No" at step 205), the routine is discontinued. When there is the response ("Yes" at step 205), the following step 206 is executed.

At step 206, the scan tool portion 41 receives the response message by using the ISO9141-2 protocol. At step 207, the scan tool portion 41 turns on the diagnosis response flag XANS2 so as to indicate that the scan tool portion 41 received the response message from the engine ECU 2. Then, the routine is discontinued. Here, as described in the abnormality detection procedure of the air-flow sensor, the engine ECU 2 detects the generation of abnormal condition every predetermined time. When the abnormal condition is detected, the engine ECU 2 stores the diagnosis code previously determined in relation to the occurrence point and the kind of the abnormal condition in the backup RAM 25. Therefore, when the engine ECU 2 receives the request message form the scan tool portion 41, the engine ECU 2 generates a response message corresponding to the request message based on the diagnosis data read from the backup RAM 25, by using the communication format shown in FIGS. 6A–6B. Then the engine ECU 2 returns the generated response message to the scan tool portion 41 by using the ISO9141-2 protocol.

Figure 7:
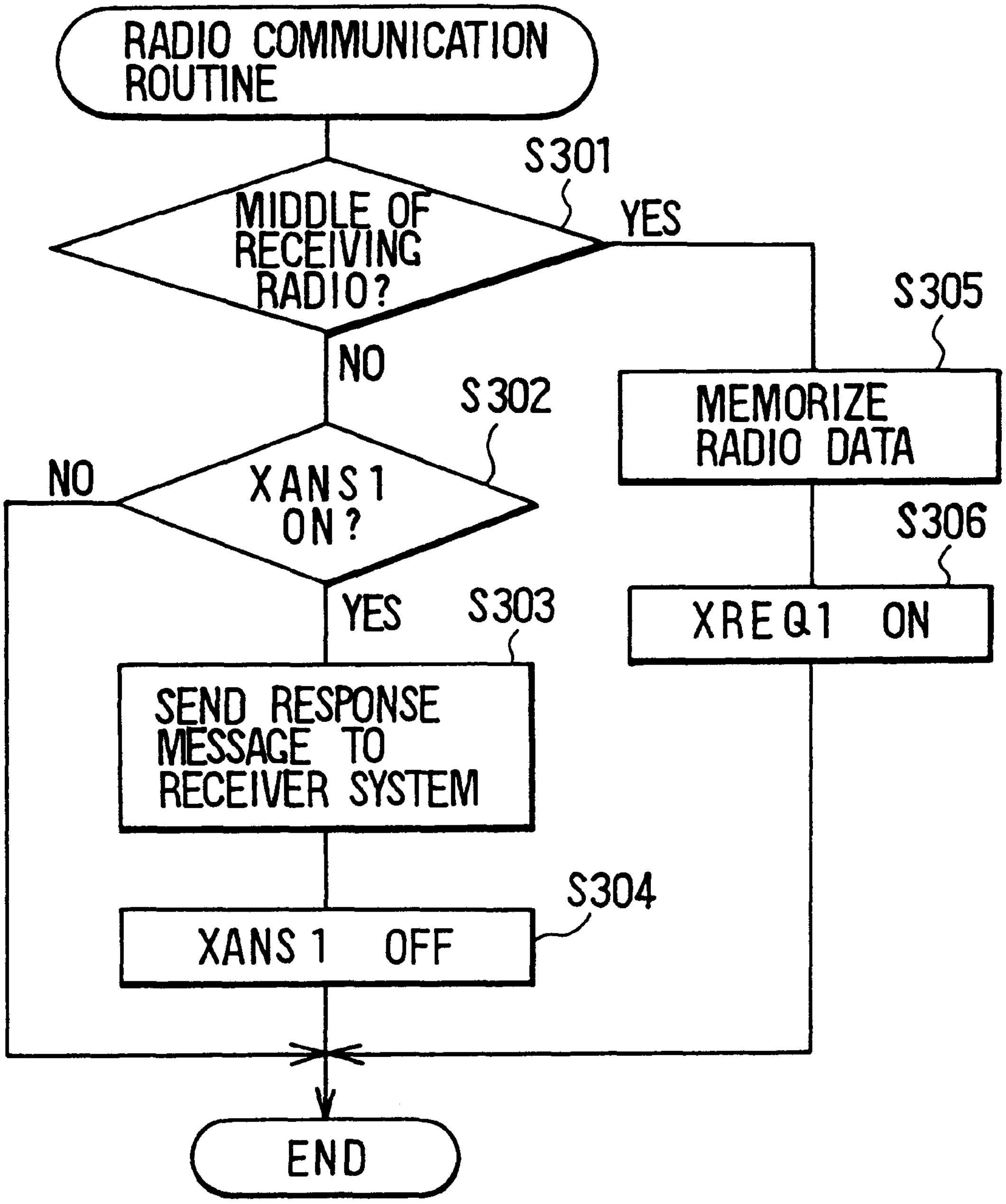
FIG. 7 is a flow chart illustrating a radio communication routine of the transponder according to the first embodiment.

A radio communication routine (procedure) of the radio communication portion 43 will be explained hereinafter with reference to a flow chart shown in FIG. 7. This radio communication routine is executed every predetermined time. When the routine starts, at step 301, the radio communication portion 43 detects whether it is in the middle of receiving the radio data from the receiver system or not. When it is not in the middle of receiving the radio data, the following step 302 is executed. At step 302, the radio communication portion 43 detects whether the radio response flag XANS1 is ON or OFF. As described above, the radio response flag XANS1 indicates that a preparation for sending the response message to the receiver system 5 is completed. When the radio response flag XANS1 is OFF, the routine is discontinued because there is no response message to be sent to the receiver system 5. When the radio response flag XANS1 is ON, the following step 303 is executed, because the preparation of response message for the receiver system 5 is completed at step 109 of the data processing routine. At step 303, the response message stored in the sending buffer is sent to the receiver system 5 by radio. At step 304, the radio communication portion 43 turns off the radio response flag XANS1, and then the routine is discontinued.

Here, when it is in the middle of receiving the radio data from the receiver system 5 at step 301, the radio communication portion 43 stores the response data (radio data) from the receiver system 5 in a sending buffer (not shown) at step 305. At step 306, the radio communication portion 43 turns on the radio request flag XREQ1 so as to indicate the fact that there is new request message, and then the routine is discontinued.

A specific example of each routine (procedure) executed in the transponder will be explained in detail hereinafter.

In the data processing routine, the transponder 4 turns on the diagnosis request flag XREQ2 every predetermined time ("yes" at step 104; 105), and assigns the element number of the diagnosis data to be collected (step 106). Then the diagnosis request flag XREQ2 is detected as ON ("Yes" at step 201) in the scan tool routine. Then the OBD II mode, ID, and the like are read with reference to the reference table in FIG. 3 based on the element number. The response message is generated by using the communication format decided by SAE. Then the transponder 4 sends the generated request message to the engine ECU 2 by using such as ISO9141-2 protocol via K-line 3 (steps 202, 203). The transponder 4 turns off the diagnosis request flag XRE2 (step 204). After that, when the engine ECU 2 returns the response message for the request message ("No" at step 201; "Yes" at step 205), the transponder 4 receives the response message (step 206), and then turns on the diagnosis response flag XANS2 (step 207). Consequently, the transponder 4 turns on the diagnosis response flag XANS2 in the data processing routine ("Yes" at step 102). The transponder 4 updates the diagnosis data in the first memory 44 based on the response message (step 107). Then the transponder 4 turns off the diagnosis response flag XANS2 (step 108). As described above, the transponder 4 collects the diagnosis data from the engine ECU 2 every predetermined time independently of existence or absence of the request form the receiver system 5, and then the transponder 4 stores the diagnosis data in the first memory 44 and updates it.

On the contrary, when there is the inquiry for diagnosis data from the receiver system 5 by the radio ("Yes" at step 301) in the radio communication routine, the transponder 4 stores the radio data (the request message in the communication formats as in FIGS. 4A–4D) in the sending buffer (step 305), and then the transponder 4 turns on the radio request flag XREQ1 (step 306). After that, the radio request flag XREQ1 is detected as ON ("Yes" at step 101) in the data processing routine. The transponder 4 generates the response message in the communication format shown in FIGS. 4A–4D by adding data such as the diagnosis data in the first memory 44 and the VIN of the second memory 45 based on the mode of the request message (step 109). Then the transponder 4 turns on the radio response message flag XANS1, and turns off the radio request flag XREQ1 (steps 110, 111). The radio response flag XANS1 is detected as ON (step 302). Then the transponder 4 sends the response message to the receiver system 5 (step 303), and turns off the radio response flag XANS1 (step 304). In this way, when there is the inquiry of the diagnosis data by the radio from the receiver system 5, the transponder 4 generates the response message in the communication format shown in FIGS. 4A–4D by adding data such as the diagnosis data in the first memory 44 and the VIN of the second memory 45, and then the response message is sent to the receiver system 5.

As described above, the transponder 4 is capable of the radio communication with the receiver system 5 and the wire communication by using such as the ISO9141-2 protocol. Furthermore, the transponder 4 is capable of reading the diagnosis data memorized in the engine ECU 2 like the external scan tool 6. Therefore, according to this embodiment, this vehicle diagnosis system can be compatible with the OBD III by only adding the transponder 4 to the conventional OBD II system. Furthermore, since the external scan tool 6 can connect to the connector 32 of the K-line 3, the vehicle diagnosis system is also compatible with the OBD II. In addition, the receiver system 5 can easily identify the vehicle, which sent the data, by investigating the VIN included in the response message from the transponder 4. Here, the diagnosis data is previously stored in the first memory 44 of the transponder 4 before the request of receiver system 5, and the diagnosis data is returned to the receiver system 5 by being read from the first memory 44. Therefore, it can shorten the total time between a receiving the request and a returning the response, compared to a system that the transponder 4 reads the data stored in the engine ECU 2 and sends to the receiver system 5 at every time the transponder 4 receives the request from the receiver system 5 by radio.

Next, an operation of transponder 4 when the external scan tool 6 is connected will be explained hereinafter. In the vehicle diagnosis system 1 according to this embodiment, the transponder 4 serially sends the request message to the ECU2 via the K-line 3 by using the ISO9141-2 protocol every predetermined time (ten seconds). The external scan tool 6, connected to the connector 32 of the K-line 3, serially sends the request message to the ECU2 via the K-line 3 by using the ISO9141-2 protocol at the timing when an operator inputs the request by the input device 65.

Here, the ISO9141-2 protocol compatible with the OBD II is a master/slave communication. When both the transponder 4 and the external scan tool 6 operate master operation as the result of connecting the external scan tool 6 to the vehicle diagnosis system 1, both the transponder 4 and the external scan tool 6 send the message at certain timings if a bus is not used. Therefore, both data may collide each other on the K-line 3.

Figure 8:
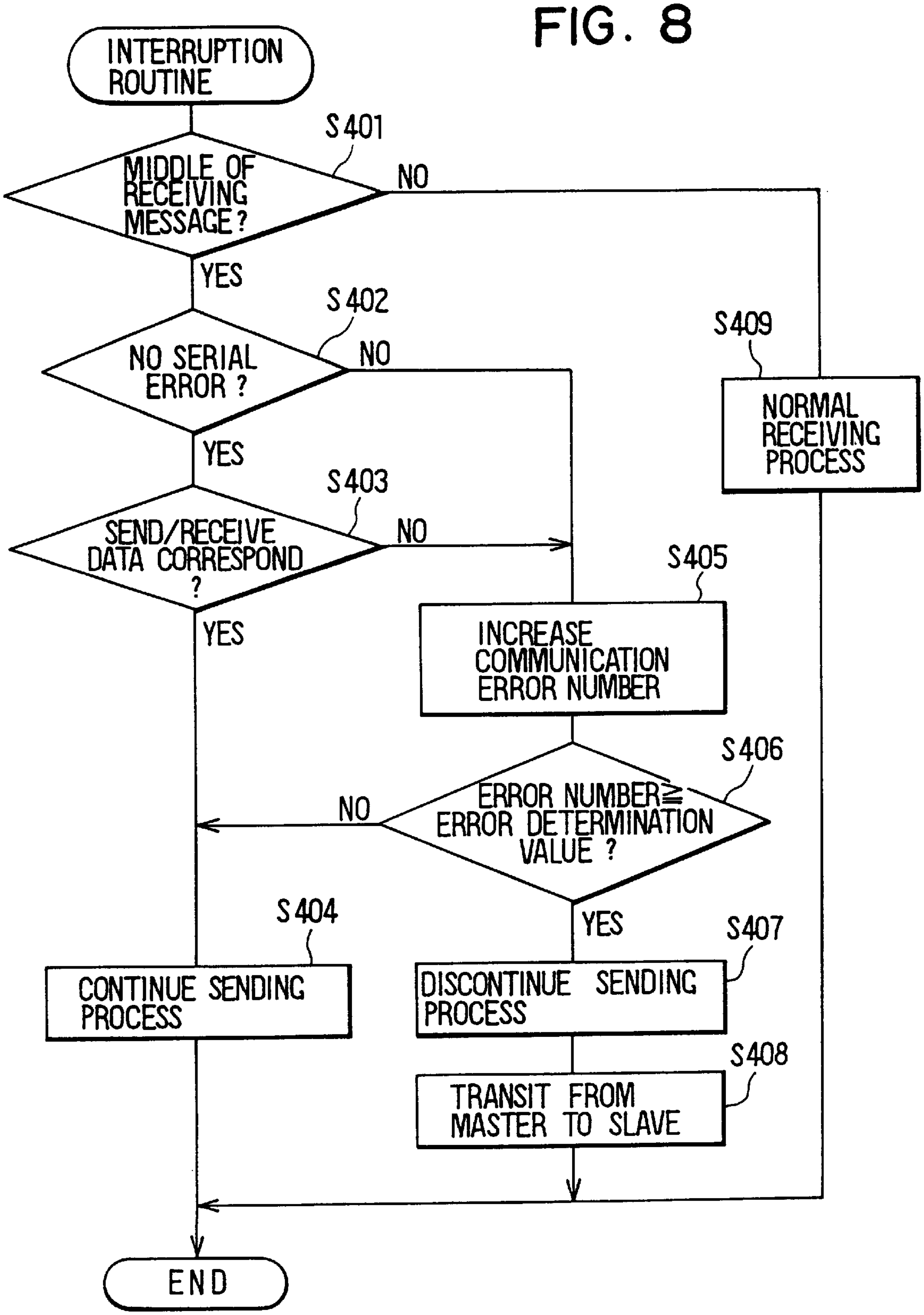
FIG. 8 is a flow chart illustrating an interruption routine for avoiding a data collision executed by the transponder according to the first embodiment.

In order to avoid the data collision, the scan tool portion 41 of the transponder 4 executes an interruption routine as shown in a flow chart in FIG. 8. The interruption routine is executed every the timing when the scan tool portion 41 receives a data by 1-byte-serial-receiving. Specifically, it is executed at the timing when the scan tool portion 41 receives the response message from the engine ECU 2 by the 1-byte-serial-receiving, and the timing when the scan tool portion 41 receives the identical data which is echo-backed via the K-line 3 after the scan tool portion 41 sends the request message by a 1-byte-serial-sending.

When the interruption routine starts, at step 401, the scan tool portion 41 detects whether it is in the middle of sending the request message from the scan tool portion 41 to the engine ECU 2 via the K-line 3. When it is not in the middle of sending ("No" at step 401),the following step 409 is executed because the serially received data in this time is not echo-backed data. At step 409, a normal receiving operation is executed, that is, the data is stored to a receiving buffer (not shown) every 1 byte. When it is in the middle of sending ("Yes" at step 401), the serially received data in this time is found to the echo-backed data. In this case, the scan tool portion 41 detects whether serial communication errors such as framing error occur or not at step 402. At step 403, the scan tool portion 41 detects whether the serially received echo-backed data corresponds to the serially sent data. When there are no serial communication errors at step 402 and when the sent data and the received data correspond each other ("Yes" at both steps 402, 403), the following step 404 is executed. At step 404, the transponder 4 turns on a sending flag, which indicates to further continue the serial sending procedure of the scan tool portion 41. Then, the routine is discontinued. When the sending flag is ON, the serial sending procedure executed every predetermined time is continued (not shown).

On the contrary, when there is a serial communication error at step 402 or when the sent data and the received data does not correspond each other (each of steps 402, 403 is "No"), the following step 405 is executed. At step 405, a communication error number is increased. At step 406, the communication error number is compared to predetermined error determination value. When the communication error number is less than the error determination value ("No" at step 406), step 404 is executed. When the communication error number is equal to the error determination value or more ("Yes" at step 406), the following step 407 is executed because the request message from the external scan tool 6 and the data may collide each other on the K-line 3. At step 407, the transponder 4 turns off the above-mentioned sending flag to discontinue the serial sending process. Then the master operation of the transponder 4 is ended. At step 408, the operation of the transponder 4 is changed from the master operation to the slave operation for predetermined trip number period. Hence, the transponder 4 sends the diagnosis data to the external scan tool 6 in response to the request from the external scan tool 6. Here, after passing the predetermined trip number, the transponder 4 executes the master operation again. During the slave operation, the transponder 4 receives the request message from the external scan tool 6 at step 409 in the interruption routine.

By executing the above-described interruption routine, the transponder 4 detects whether the data collision occurs or not on the K-line 3. When there is data collision, the transponder 4 discontinues the serial sending process to the K-line 3, and avoids the further data collision by operating as the slave of the external scan tool 6. In addition, since the transponder 4 executes such an interruption routine to avoid the data collision, the vehicle diagnosis system 1 can use even the conventional external scan tool.

Here, it might be enough to stop the master operation of the transponder 4 so as only to avoid the data collision. However, by changing the operation of the transponder 4 to the slave operation of the external scan tool 6, the external scan tool 6 can request both the engine ECU 2 and the transponder 4 to collect both diagnosis data. Hence, for example, when the collected diagnosis data from the engine ECU 2 is more detailed as to one information, and the collected data from the transponder 4 is more detailed as to another information, the external scan tool can select one of detailed information to collect.

Figure 9:
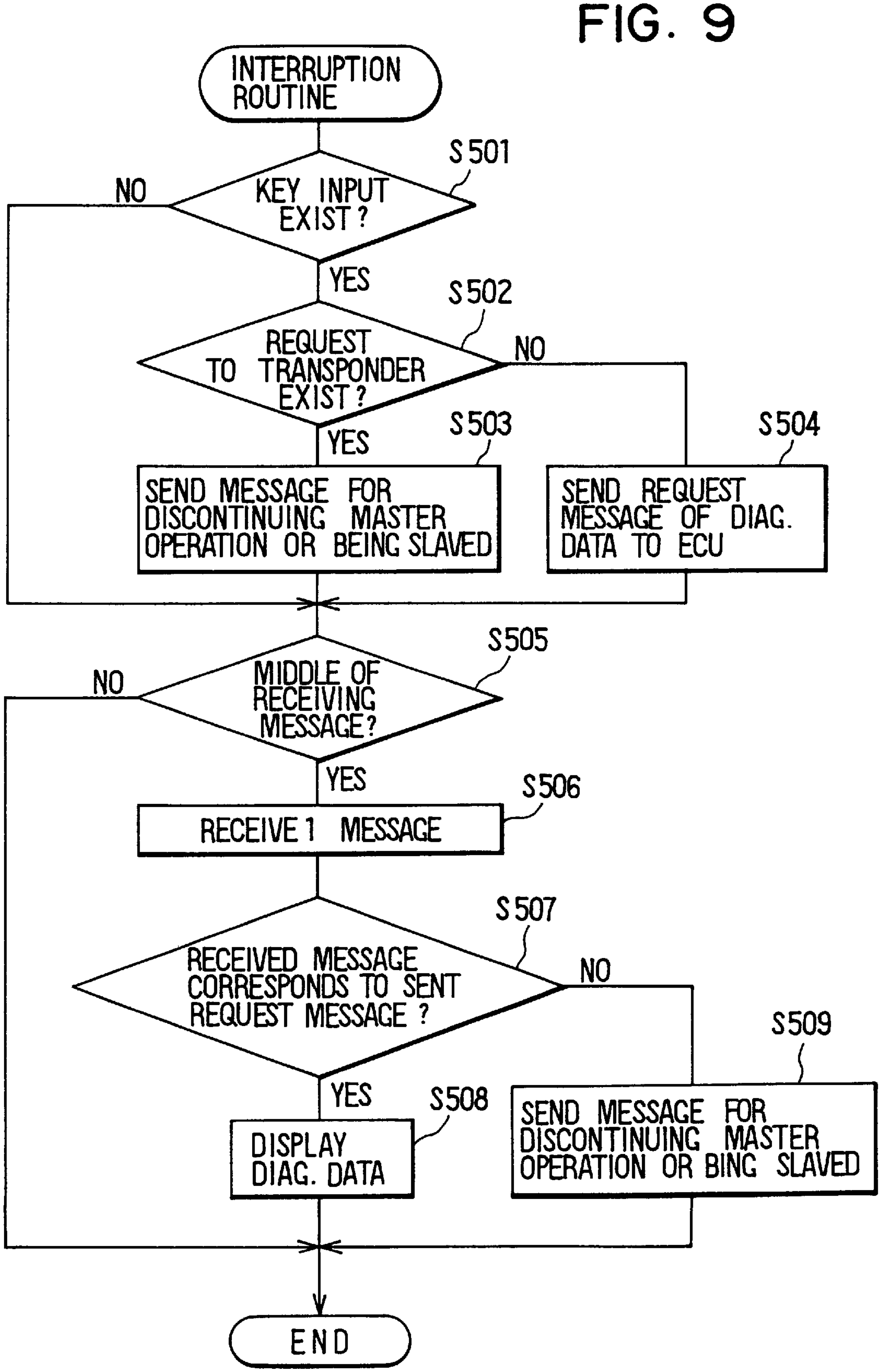
FIG. 9 is a flow chat illustrating an interruption routine for avoiding a data collision executed by an external scan tool according to the first embodiment.

Here, in order to avoid the data collision on the K-line 3, the external scan tool 6 may execute an interruption routine as shown in a flow chart in FIG. 9, replaced with the interruption routine, as shown in FIG. 8, executed by the transponder 4. The interruption routine of the external scan tool 6 and the interruption routine of the transponder 4 can be executed, independently, or at the same time. It may be adapted at least one of the interruption routine of the external scan tool 6 and the interruption routine of the transponder 4.

In this case, for convenience, it is postulated that the operator of the external scan tool 6 operates key-input to request for discontinuation the master operation or being slaved, before he/she operates key-input to request for collecting the diagnosis data from the engine ECU 2. For convenience of the explanation, it assumes that there is no request for diagnosis data from the external scan tool 6 to the transponder 4.

Figure 10:
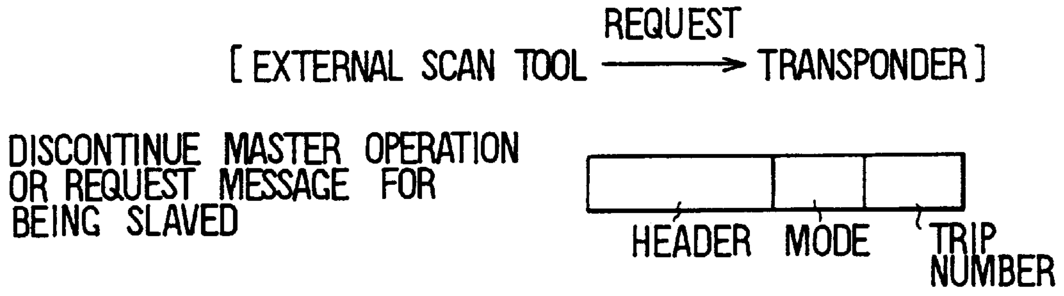
FIG. 10 is a diagram illustrating communication formats of request message for discontinuation a master operation and request message for being slaved.

The interruption routine shown in FIG. 9 is executed every predetermined time. When the routine starts, at step 501, the external scan tool 6 detects whether there is the key-input to be sent to the K-line 4 is input via the input device 65. When there is no key-input ("No" at step 501), the following step 505 is executed. When there is key-input ("Yes" at step 501), the external scan tool 6 detects whether the request by the key-input is for the transponder 4 or not at step 502. When the request is not for the transponder 4 ("No" at step 502), the following step 504 is executed because the request is for the engine ECU 2. At step 504, the external scan tool 6 generates a message for request of the diagnosis data by using the communication format decided by SAE, and send the message to the engine ECU 2 via the K-line 3 by using the ISO9141-2 protocol. On the contrary, when the request is for the transponder 4 ("Yes" at step 502), the following step 503 is executed. At step 503, the external scan tool 6 generates the message for one of request for discontinuation the master operation or being slaved, by using the communication format decided by SAE, and then send the message to the transponder 4 via the K-line 3 by using the ISO9141-2 protocol. As shown in FIG. 10, the request for discontinuation the master operation or being slaved is carried out by using a communication format including a header, a mode assignment and a trip number assignment. Here, the header includes the data that this request is for the transponder 4. The mode assignment includes the data that instructs whether the master operation or the slave operation. The trip number assignment includes the data that instructs the slaved operation period.

After that, at step 505, the external scan tool 6 detects whether it is in the middle of receiving the message via the K-line 3. When it is not in the middle of receiving ("No" at step 505), a menu picture or the like is displayed on the display device 64, and the routine is discontinued. On the contrary, when it is in the middle of receiving ("Yes" at step 505), the external scan tool 6 receives 1 message at step 506, and detects whether the external scan tool 6 sent the request corresponding to the received message. When the external scan tool 6 sent the request corresponding to the received message ("Yes" at step 507), an obtained diagnosis data is displayed on the display device 64, and then the routine is discontinued. On the contrary, when the external scan tool 6 did not send such a request ("No" at step 507), the following step 509 is executed, because it shows that another master such as the transponder 4 exists besides the external scan tool 6. At step 509, the external scan tool 6 generates the message for one of request for discontinuation the master operation or being slaved, by using the communication format decided by SAE, and send the message to the transponder 4 via the K-line 3 by using the ISO9141-2 protocol. Then the routine is discontinued.

As described above, the operator of the external scan tool 6 operates key-input to request discontinuation of the master operation or being slaved, before he/she operates key-input to request for collecting the diagnosis data from the engine ECU 2. Therefore, it can avoid the data collision between the request form the external scan tool 6 and the request from the transponder 4 on the K-line 3.

Figure 11:
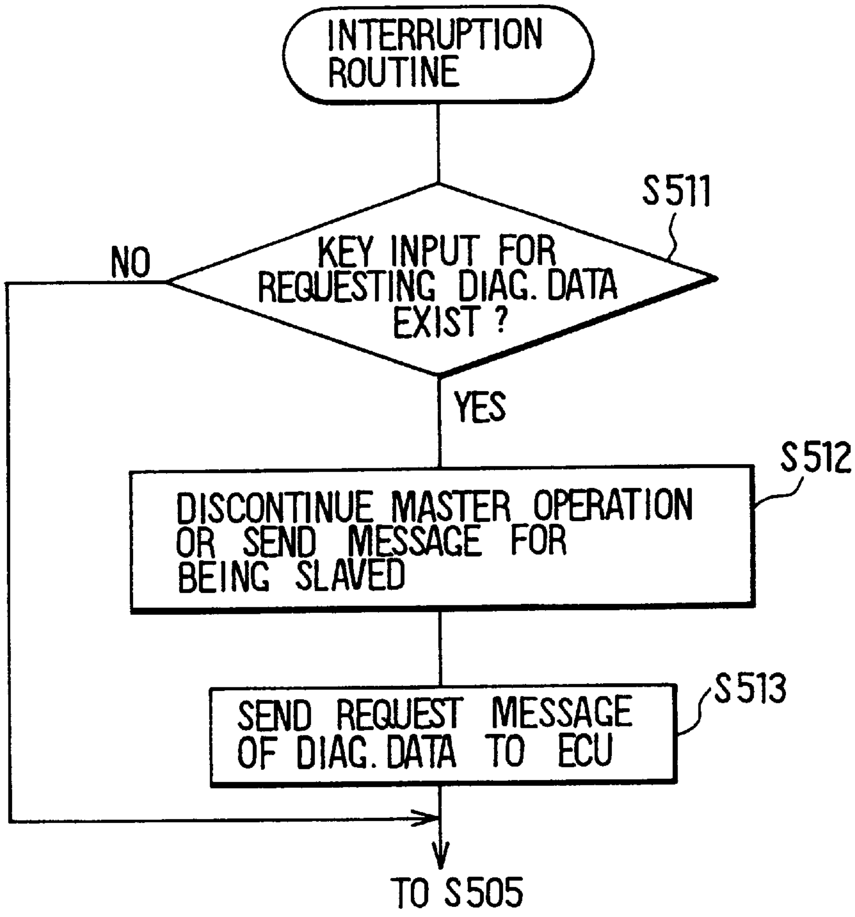
FIG. 11 is a flow chat illustrating a modified interruption routine for avoiding a data collision executed by an external scan tool according to the first embodiment.

It is acceptable to execute an interruption routine as shown in a flow chart in FIG. 11 replaced with the interruption routine in FIG. 9. FIG. 11 shows one part of routine, in which steps 511–513 replace steps 501–504 in FIG. 9. Other steps after step 513 are the same as steps 505-END in FIG. 9. As shown in FIG. 11, at step 511, the external scan tool 6 detects whether the operator operates the key-input to request for collecting the diagnosis data from the engine ECU 2. When such the key-input is operated ("Yes" at step 511), the external scan tool 6 sends the message, which is for one of request for discontinuation the master operation or being slaved, to the transponder 4 via the K-line 3 at step 512. At step 513, the external scan tool 6 sends the message for requiring the diagnosis data to the engine ECU 2 via the K-line 3. In this case, it does not need the operator to operate the key-input to request the transponder 4 for discontinuation the master operation or being slaved.

Now, in the flow charts shown in FIGS. 8, 9, when the periods, that the transponder 4 discontinues the master operation or operates as the slave, is assigned by the trip number, the following inconvenience may occur. That is, when the assigned trip number is set to an extremely large number unexpectedly, the transponder 4 may not be able to communicate with the receiver system 5 by radio after the vehicle returns from the repair shop because the transponder 5 may not return the master operation.

Figure 12:
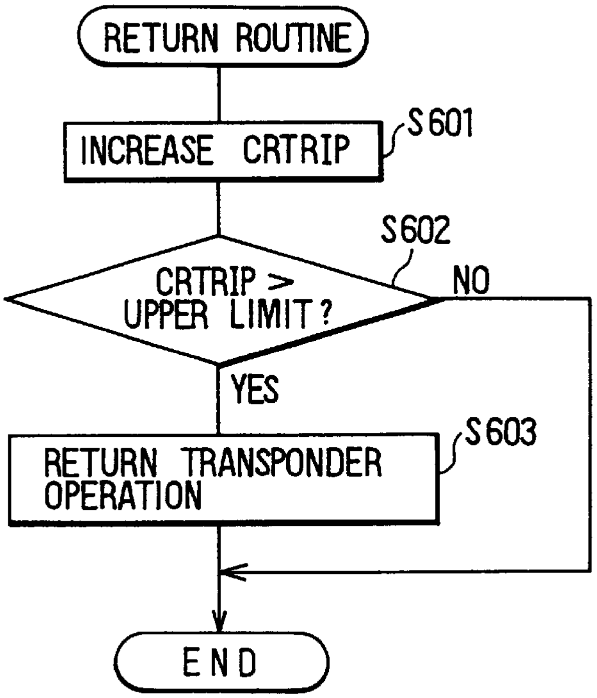
FIG. 12 is a flow char illustrating a return routine executed by the transponder according to the first embodiment.

In order to avoid such inconvenience, the transponder 4 executes a return routine shown in a flow chart in FIG. 12. This return routine is executed every time when the ignition switch is turned on. When the routine starts, at step 601, a counter value CRTRIP of a trip counter (not shown) is increased. The trip counter counts the trip number, which is a number the external scan tool does not access to the K-line 3. Here, the CRTRIP is reset every timing the external scan tool 6 accesses to the K-line 3. In this embodiment, the CRTRIP is reset when the transponder receives the message from the external scan tool 6 via the K-line 3, because that situation can be considered that the external scan tool 6 accesses to the K-line 3. Specifically, the transponder 4 detects receiving of the message based on the header of the message. At step 602, the transponder 4 detects whether the CRTRIP exceeds a predetermined upper limit or not. When the CRTRIP does not exceed the upper limit ("No" at step 602), the transponder 4 discontinues of this routine, and continues the discontinuation the master operation or operating as the slave. On the contrary, when the CRTRIP exceeds the upper limit ("Yes" at step 602), the transponder 4 returns to its operation, because this shows that the period, which the external scan tool does not access to the K-line 3, exceeds the predetermined trip number. In this situation, it can be considered that the vehicle has returned to the user after removing the external scan tool 6.

Figure 13:
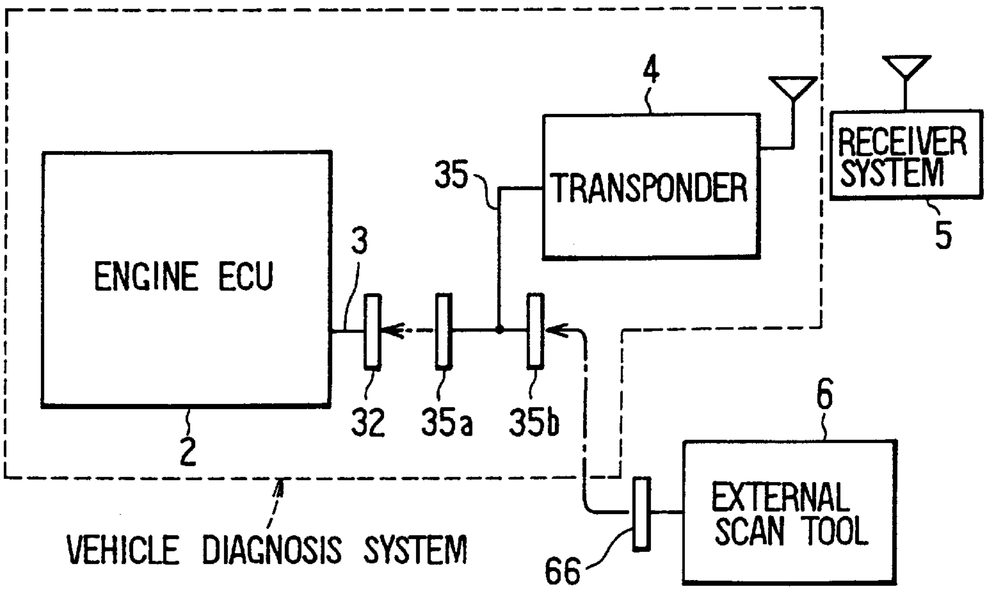
FIG. 13 is a schematic diagram illustrating a construction of whole system of a modified vehicle diagnosis system according to a first embodiment of the present invention.

Now, in this embodiment, a transponder 4 having a joint wire 35 as shown in FIG. 13 may be used. The joint wire 35 is a communication wire, which is compatible with the OBD II, has a first wire portion connected to the transponder 4 and a second wire portion connected to the first wire portion at an intermediate portion. The second wire portion has a first connector 35*a* for connecting to the connector 32 of the K-line 3 and a second connector 35*b* having the same structure as the connector 32 of the K-line 3. That is, the joint wire 35 is connected between the connector 32 or the K-line 3 and the connector 66 of the external scan tool 6. The transponder 4 can become compatible with the OBD III easily by only connecting the connector 35*a* to the engine ECU 2, which is compatible with conventional OBD II. Furthermore, the external scan tool 6, which is compatible with conventional OBD II, can be also used by only connecting the connector 66 to the connector 35*b* of the joint wire 35.

In this embodiment, the present invention has been explained based on the vehicle diagnosis system that the engine ECU 2 is connected to the K-line 3 as the mounted engine ECU. However, another EUC mounted on another vehicle may be connected to the K-line 3 in parallel with the engine ECU 2.

(Second Embodiment)

Figure 14:
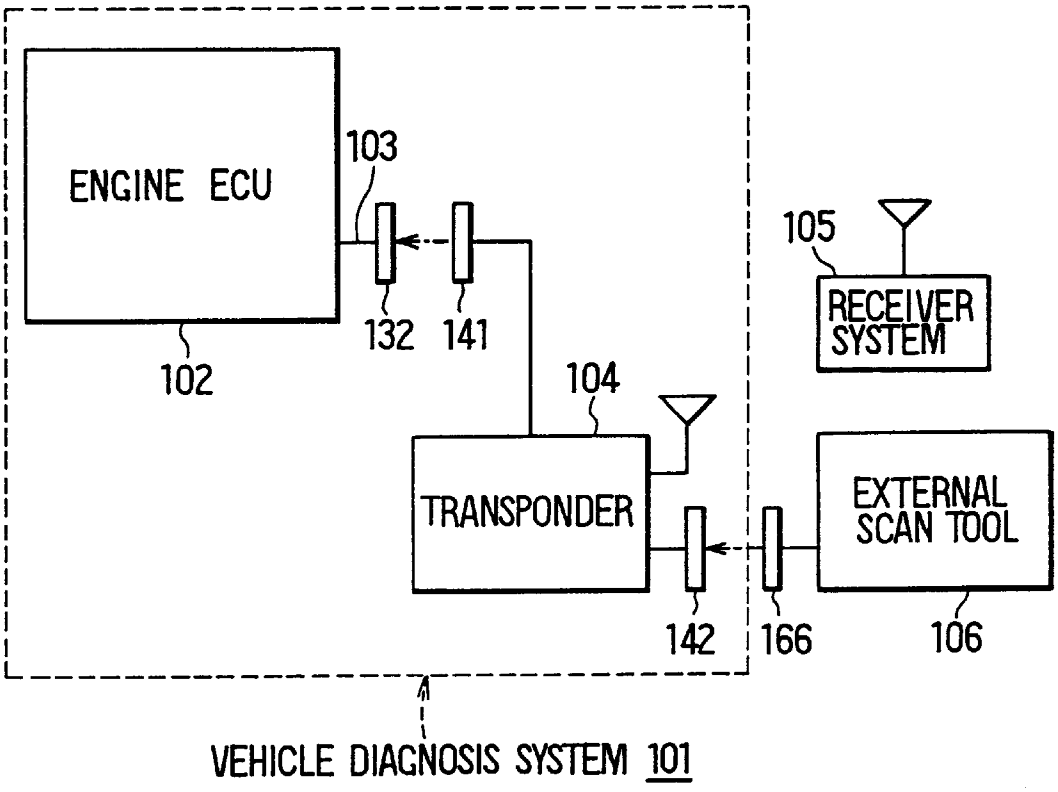
FIG. 14 is a schematic diagram illustrating a construction of whole system of a vehicle diagnosis system according to a second embodiment of the present invention.

A Second embodiment of the present invention will be described hereinafter with reference to FIGS. 14–16. A vehicle diagnosis system 101, as shown in FIG. 14, includes an engine ECU 102 (hereinafter engine ECU 102), a K-line 103 and a transponder 104. The transponder 104 has a first connector 104 for connecting a connector 132 of the K-line 103 and a second connector, which has the same structure as the connector 132. The engine ECU 102 and the transponder 104 are connected via the K-line 103 by connecting a connector 141 of the transponder 104 to the connector 132 of the K-line 103. A connector 166 of an external scan tool 106 is detachably connected to the connector 142 of the transponder 104. Here, the constructions of the engine ECU 102, the K-line 103, the transponder 104, a receiver system 105 and the external scan tool 106 are substantially equal to those of the engine ECU 2, the K-line 3, the transponder 4, the receiver system 5, respectively.

Next, an operation of the transponder 104 of the vehicle diagnosis system 101 according to this embodiment will be explained hereinafter. A base process of the transponder 104 is to communicate with the receiver system 105 by radio. An interruption process (routine) of the transponder 104 is to communicate with the external scan tool 106 via the K-line 103 by using the ISO9141-2 protocol. In this embodiment, only when there is a request from the receiver system by radio, the transponder 104 transforms the received request from the radio communication format shown in FIGS. 4A–4D to the communication format shown in FIGS. 6A–6B. Then the transponder 104 sends the transformed request to the engine ECU 102, receives its response, transforms the format of the response again, and returns the transformed response to the receiver system 105 by radio.

Figure 15:
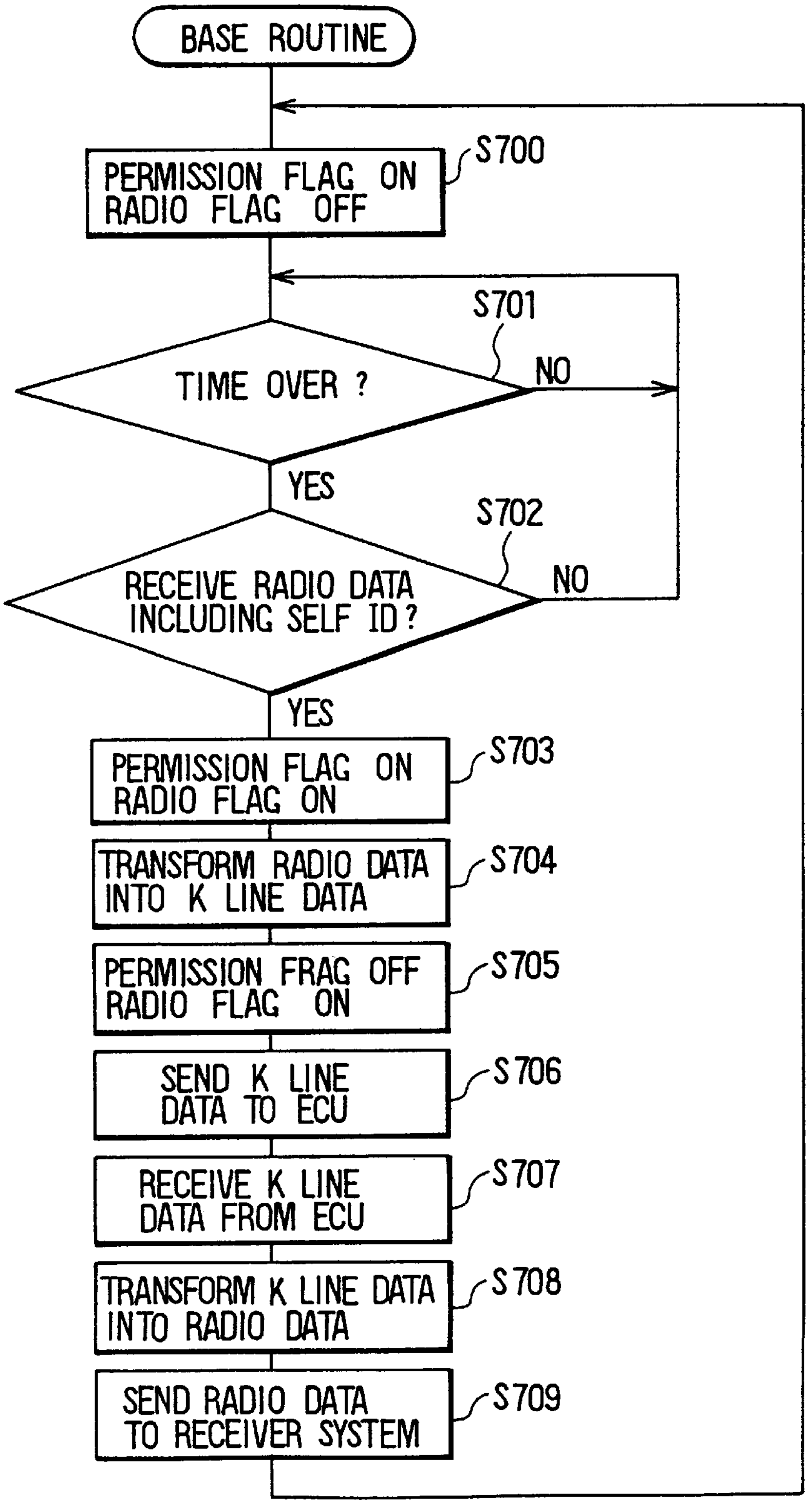
FIG. 15 is a flow chart illustrating a base routine of a transponder according to the second embodiment.
Figure 16:
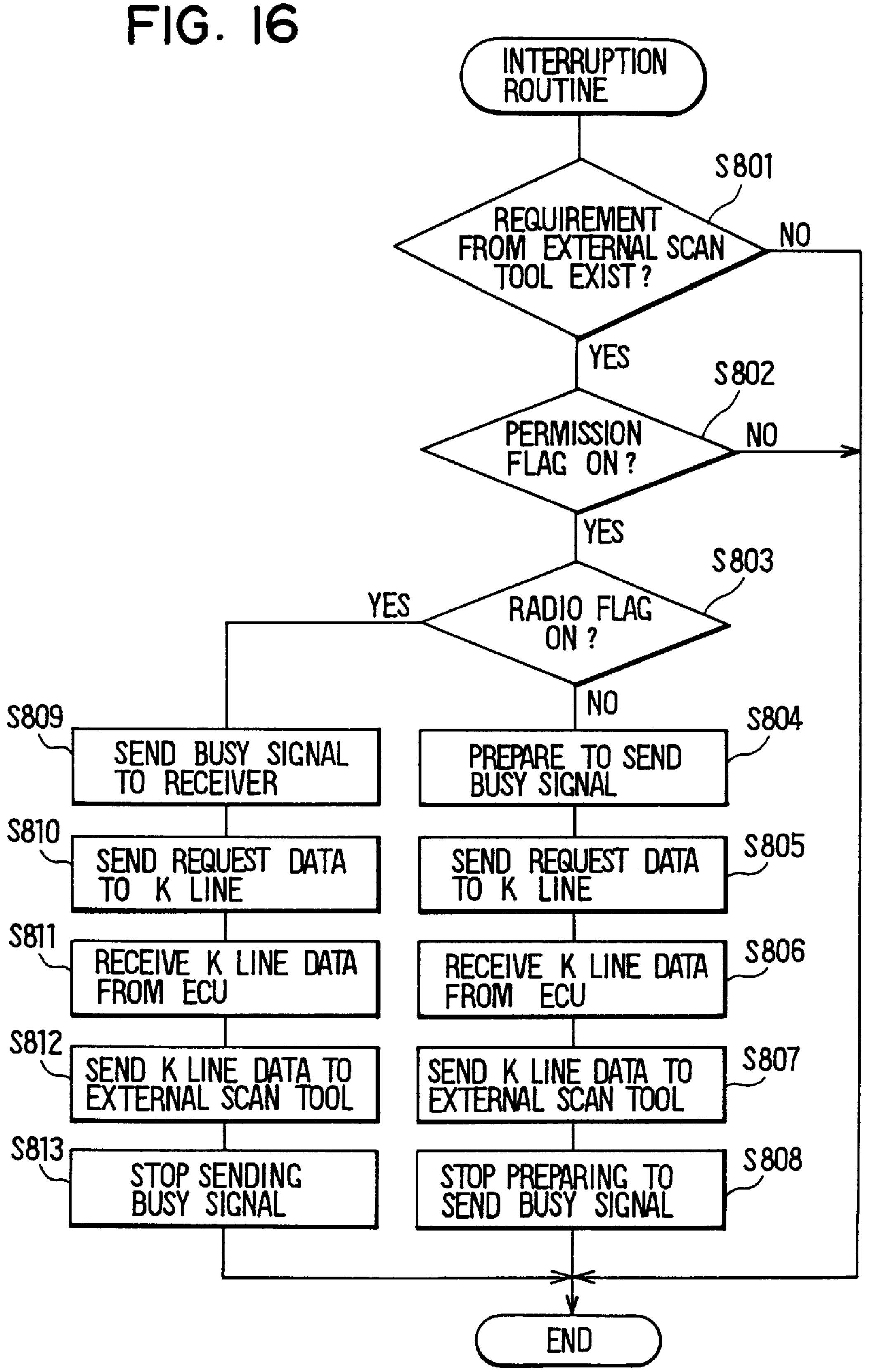
FIG. 16 is a flow chart illustrating an interruption routine of the transponder according to the second embodiment.

FIG. 15 shows a base routine (process) executed by the transponder 104. This base routine is initialized every time the transponder is powered on. When the base routine starts, at step 700, the transponder 104 turns on a permission flag, and turns off a radio flag. Here, when there is a request from the receiver system 105 on the K-line 103 or a K-line data, which is a response from the engine ECU 102 for the request, if a K-line data from the external scan tool 106 interrupts into the K-line 103, the K-line from the external scan tool 106 may collide with the previously existing K-line data on the K-line 103. The permission flag is for deciding whether an interruption routine (described after) should be permitted or prohibited. That is, the permission flag is turned off to prohibit the interruption routine so as to avoid the K-line data collision, and turned on at the other condition to permit the interruption routine. The radio flag is turned on while from a first timing, when the transponder 104 receives a radio data as the request message including a transponder ID (Self-ID) from the receiver system, to a second timing, when the transponder sends a radio data as the response message to the receiver system for the request message. On the contrary, the radio flag is turned off at the other condition.

At step 701, the transponder 104 detects whether it is in the middle of predetermined timing to sampling the radio data from the receiver system 105. When it is not in the middle of the predetermined timing ("No" at step 701), the transponder 104 stands by. When it is in the middle of the predetermined timing ("Yes" at step 701), the following step 702 is executed. At step 702, the transponder 104 receives the radio data, and detects whether the received radio data includes the Self-ID. When the radio data does not include the Self-ID ("No" at step 702), the routine returns to step 701. When the radio data includes the Self-ID ("Yes" at step 702), the following step 703 is executed. At step 703, the transponder 104 turns on the radio flag, and maintains the permission flag on.

At step 704, the transponder 104 transforms the format of the radio data (see FIGS. 4A–4D) as the request message into the K-line data format (see FIGS. 6A–6B). At step 705, the transponder 104 turns off the permission flag. At step 706, the transponder 104 sends the transformed K-line data to the engine ECU 102. At step 707, the transponder 104 receives a K-line data as the response message from the engine ECU 102 (response K-line data). At step 708, the transponder 104 transforms the format of the response K-line data into the radio data by adding the VIN to the response K-line data. At step 709, the transponder 104 sends the radio data to the receiver system 105. Then the routine returns to step 700, the transponder 104 turns on the permission flag, and turns off the radio flag.

Next, an interruption routine executed by the transponder 104 will be explained with reference to a flow chart shown in FIG. 16. The interruption routine is initialized every predetermined time. When the interruption routine starts, at step 801, the transponder 104 detects whether there is an interruption request form the external scan tool 106. At step 802, the permission flag is detected whether it is NO or OFF. When there is no interruption request from the external scan tool 106 or the permission flag is OFF ("No" at step 801 or 802), the routine is discontinued. Here, the interruption request from the external scan tool 106 is generated when the operator operates the key-input for request to collect the diagnosis data by using the input device of the external scan tool 106.

When there is the interruption request from the external scan tool 106 at step 801, and the permission flag is ON at step 802 ("Yes" at steps 801, 802), the following step 803 is executed. At step 803, the transponder 104 detects whether the radio flag is ON or OFF. When the radio flag is OFF ("No" at step 803), the following step 804 is executed. Here, when it takes long time to communicate between the external scan tool 106 and the engine ECU 102, the transponder 104 may receive the radio data from the receiver system 105 even if the transponder has not received the radio data including the Self-ID from the receiver system 105. Therefore, at step 804, the transponder 104 sends a busy signal (a signal indicating impossible to response because another process is being executed) to the receiver system 105. At step 805, the transponder 104 sends the request message from the external scan tool 106 to the K-line 103 without changing. Since the transponder 104 communicates with the external scan tool 106 by using the K-line data, the request message can be sent without changing. At step 806, the transponder 104 receives the K-line data as the response message from the engine ECU 2. At step 807, the transponder 104 sends the K-line data to the external scan tool 106 without changing. At step 808, the transponder 104 stops preparation for sending the busy signal. Then the routine is discontinued, and returned to the base routine. When the radio data is received from the receiver system 105 during the process of steps 805–807, the transponder 104 sends the prepared busy signal to the receiver system 105.

At step 803, when the radio flag is ON ("Yes" at step 803), the transponder 104 sends the busy signal to the receiver system 105 so as to precede the interruption routine. In this situation, the radio data including the Self-ID has already been received, and the transponder 104 is about to transform the format of the radio data to the K-line data format and is about to send the transformed data to the engine ECU 2. At step 810, the request message from the external scan tool 106 is sent to the K-line without changing. At step 811, the transponder 104 receives the K-line data as the response message from the engine ECU 102 for the request message. At step 812, the transponder 104 sends the K-line data to the external scan tool 106 without changing. At step 813, the transponder 104 stops sending the busy signal to the receiver system 105, and then the routine is discontinued and return to the base routine.

As described above, according to the vehicle diagnosis system 101 of this embodiment, this system can become compatible with the OBD III easily by only adding the transponder 104 to the conventional OBD II system. Furthermore, since the external scan tool 106 can be connected to the connector 142 of the transponder 104, this system is also compatible with conventional OBD II.

Since the transponder 104 returns the data, which is formed by adding the VIN, to the receiver system 105, the receiver system 105 can easily identify the vehicle, which sent the data, by investigating the VIN.

Furthermore, while the transponder 104 receives the diagnosis data from the engine ECU 102 based on the request from the receiver system 105, the transponder 104 inhibits the interruption against the external scan tool 106. While the transponder 104 collects the diagnosis data from the engine ECU 102 based on the request from the external scan tool 106, the transponder sends the busy signal to the receiver system 105. Therefore, the transponder 104 can cope with both requests without data collision on the K like 103.

In this embodiment, the same as the first embodiment, the transponder 104 may adopt the following steps. The transponder 104 requests the diagnosis data to the engine ECU every predetermined time and stores the response in its backup RAM, independently of the request from the receiver system 105 by radio. When there is the request from the receiver system 105 by radio or the request from the external scan tool 106, the diagnosis data stored in the backup RAM is read and sent the data as the response. In this case, it can shorten the total time between receiving the request and returning the response. Furthermore, since the transponder 104 communicates with only the engine ECU 102 on the K-line 103, it can avoid the data collision.

What is claimed is:

1. A vehicle diagnosis system, comprising:

an ECU that controls an operation of an electronic device mounted on a vehicle, and stores operation data related to an operation condition of the electronic device;

a communication line connected to the ECU;

a transponder that receives a request signal from an external radio communication device by radio, reads the operation data concerning the operation condition in response to the request signal, and sends the operation data to the external radio communication device by radio; and a connector connected to the communication line, for detachably connecting an external scan tool that reads the operation data stored in the ECU:

wherein the communication line is a line which is compatible with OBDII; and wherein the ECU communicates with the transponder and the external scan tool via the communication line.

2. A vehicle diagnosis system according to claim 1, wherein the external scan tool connected to the connector sends a request message to the transponder so that the transponder operates as a slave of the external scan tool.

3. A vehicle diagnosis system according to claim 1, wherein the transponder sends the operation data after adding a vehicle code to the read operation data.

4. A vehicle diagnosis system according to claim 1, wherein:

the transponder has a memory to store the operation data;

the transponder reads the operation data from the ECU every predetermined time to store in the memory, reads the operation data stored in the memory upon receipt of the request signal from the external radio communication device, and send the read operation data to the external radio communication device.

5. A vehicle diagnosis system according to claim 1, wherein the transponder stops reading the operation data from the ECU when the external scan tool accesses to the ECU.

6. A vehicle diagnosis system according to claim 1, wherein the external scan tool sends a stop request signal to the transponder so that the transponder stops reading the operation data from the ECU.

7. A vehicle diagnosis system according to claim 5, wherein the transponder stops reading the operation data during a predetermined trip number period.

8. A vehicle diagnosis system according to claim 5, wherein the transponder restarts reading the operation data when a stop interval, in which the external scan tool does not access to the communication line after the transponder stops reading the operation data, exceeds a predetermined upper limit.

9. A vehicle diagnosis system according to claim 1, wherein the transponder operates as a slave of the external scan tool when the external scan tool connected to the connector accesses to the ECU.

10. A vehicle diagnosis system according to claim 9, wherein the transponder stop operating as the slave when a stop interval, in which the external scan tool does not access to the communication line after the transponder starts operating as the slave of the external scan tool, exceeds a predetermined upper limit.

11. A vehicle diagnosis system according to claim 9, wherein the transponder operates as the slave of the external scan tool during a predetermined trip number period.

12. A vehicle diagnosis system, comprising:

an ECU that controls an operation of an electronic device mounted on a vehicle, and stores operation data related to an operation condition of the electronic device;

a communication line connected to the ECU;

a transponder that receives a request signal from an external radio communication device by radio, reads the operation data concerning the operation condition in response to the request signal, and sends the operation data to the external radio communication device by radio; and a connector connected to the transponder, for detachably connecting an external scan tool that reads the operation data stored in the ECU.

13. A vehicle diagnosis system according to claim 12, wherein the transponder sends the operation data after adding a vehicle code to the read operation data.

14. A vehicle diagnosis system according to claim 12, wherein:

the communication line is a K-line which is compatible with OBD II; and the transponder communicates with the ECU and the external scan tool via the communication line.

15. A vehicle diagnosis system according to claim 12, wherein when the transponder reads the operation data from the ECU in response to the request signal from the external radio communication device, the transponder sends a stop signal to the external scan tool connected to the transponder via the connector so that the external scan tool stops sending the request signal to the transponder.

16. A vehicle diagnosis system according to claim 13, wherein when the transponder reads the operation data from the ECU in response to the request signal from the external scan tool connected to the transponder via the connector, the transponder sends a stop signal to the external radio communication device so that the external radio communication device stops sending the request signal to the transponder.

17. A vehicle diagnosis system according to claim 12, wherein:

the transponder includes a memory to store the operation data; and the transponder reads the operation data from the electronic unit every predetermined time to store in the memory, reads the operation data stored in the memory upon receipt of the request signal from one of the external radio communication device and the external scan tool connected to the transponder via the connector, and send the read operation data.

18. A vehicle diagnosis apparatus, comprising:

a first terminal for connecting an ECU that controls an operation of an electronic device mounted on a vehicle and stores operation data related to an operation condition of the electronic device;

a second terminal for connecting an external scan tool that reads the operation data stored in the ECU; and a transponder connected by electric wires to both the first and the second terminal, that receives a request signal from an external radio communication device by radio, reads the operation data concerning the operation condition in response to the request signal, and that sends the operation data to the external radio communication device by radio.

19. A vehicle diagnosis apparatus according to claim 18, wherein the external scan tool sends a request message to the transponder so that the transponder operates as a slave of the external scan tool.

20. A vehicle diagnosis apparatus according to claim 18, further comprising:

a first connector connected to the first terminal for connecting a third terminal of the ECU; and a second connector connected to the second terminal for connecting a fourth terminal of the external scan tool.

21. A vehicle diagnosis apparatus according to claim 20, wherein the transponder is connected between the ECU and the external scan tool via the first and the second connector.

22. A vehicle diagnosis apparatus according to claim 18, wherein the transponder stops reading the operation data from the ECU when the external scan tool accesses to the ECU.

23. A vehicle diagnosis apparatus according to claim 18, wherein the external scan tool sends a stop request signal to the transponder so that the transponder stops reading the operation data from the ECU.

24. A vehicle diagnosis apparatus according to claim 22, wherein the transponder stops reading the operation data during a predetermined trip number period.

25. A vehicle diagnosis apparatus according to claim 22, wherein the transponder restarts reading the operation data when a stop interval, that the external scan tool does not access to the ECU after the transponder stops reading the operation data, exceeds a predetermined upper limit.

26. A vehicle diagnosis apparatus according to claim 18, wherein the transponder operates as a slave of the external scan tool when the external scan tool accesses to the ECU.

27. A vehicle diagnosis apparatus according to claim 26, wherein the transponder stop operating as the slave when a stop interval, that the external scan tool does not access to the ECU after the transponder starts operating as the slave of the external scan tool, exceeds a predetermined upper limit.

28. A vehicle diagnosis apparatus according to claim 26, wherein the transponder operates as the slave of the external scan tool during a predetermined trip number period.

29. A vehicle diagnosis method using a vehicle diagnosis system, in which an external scan tool is connected to one of an ECU and a transponder connected to the ECU, comprising steps of:

receiving a request signal from an external radio communication device by radio by the transponder;

reading an operation data concerning the operation condition in response to the request signal;

sending the operation data to the external radio communication device by radio;

detecting an access of the external scan tool accesses to the ECU;

stopping reading the operation data from the ECU by the transponder when the external scan tool accesses to the ECU.

30. A vehicle diagnosis method according to claim 29, wherein the detecting step includes a sending a stop request signal from the external scan tool to the transponder so that the transponder stops reading the operation data from the ECU.

31. A vehicle diagnosis method according to claim 29, further comprising steps of:

detecting whether a stopping interval, in which the external scan tool does not access to the communication line after the transponder stops reading the operation data, exceeds a predetermined trip number period; and restarting reading the operation data when the stopping interval exceeds the predetermined trip number period.

32. A vehicle diagnosis method according to claim 29, further comprising steps of:

detecting whether a stopping interval, in which the external scan tool does not access to the communication line after the transponder stops reading the operation data, exceeds a predetermined upper limit; and restarting reading the operation data when the stopping interval exceeds the predetermined upper limit.

33. A vehicle diagnosis method using a vehicle diagnosis system, in which an external scan tool is connected to one of an ECU and a transponder connected to the ECU, comprising steps of:

receiving a request signal from an external radio communication device by radio by the transponder;

reading an operation data concerning the operation condition in response to the request signal by the transponder;

sending the operation data to the external radio communication device by radio;

detecting an access of the external scan tool accesses to the ECU;

changing an operation of the transponder from a master operation to a slave operation of the external scan tool when the external scan tool accesses to the ECU.

a connector connected to the communication line, for detachably connecting an external scan tool that reads the operation data stored in the ECU.

34. A vehicle diagnosis method according to claim 33, wherein the detecting step includes a sending a request message to the transponder so that the transponder operates as a slave of the external scan tool.

35. A vehicle diagnosis method according to claim 33, further comprising steps of:

detecting whether a slaving interval exceeds a predetermined trip number period; and changing the operation of the transponder from a slave to a master when the slaving interval exceeds the predetermined trip number period.

36. A vehicle diagnosis method according to claim 33, further comprising steps of:

detecting whether a slaving interval, in which the external scan tool does not access to the communication line after the transponder starts operating as the slave of the external scan tool, exceeds a predetermined upper limit; and changing the operation of the transponder from a slave to a master when the slaving interval exceeds the predetermined upper limit.

* * * * *